United States Patent [19]

Matteson

[11] Patent Number: 4,974,148

[45] Date of Patent: Nov. 27, 1990

[54] BUS ARBITER WITH EQUITABLE PRIORITY SCHEME

[75] Inventor: Keith D. Matteson, Austin, Tex.

[73] Assignee: Motorola Computer X, Inc., Schaumburg, Ill.

[21] Appl. No.: 70,283

[22] Filed: Jul. 6, 1987

[51] Int. Cl.⁵ .............................................. G06F 13/36
[52] U.S. Cl. ..................... 364/200; 364/242.6; 364/242.8; 364/242.7
[58] Field of Search ... 364/200 MS File, 900 MS File

[56] References Cited

U.S. PATENT DOCUMENTS

| | | | |
|---|---|---|---|
| 3,603,935 | 9/1971 | Moore | 364/200 |
| 4,009,470 | 2/1977 | Danilenko et al. | 364/200 |
| 4,017,841 | 4/1977 | Jensen | 364/900 |
| 4,023,143 | 5/1977 | Braunstein | 364/200 |
| 4,232,294 | 11/1980 | Burke et al. | 364/200 |
| 4,314,335 | 2/1982 | Pezzi | 364/200 |
| 4,320,467 | 3/1982 | Glass | 364/900 |
| 4,535,330 | 8/1985 | Carey et al. | 340/825.5 |
| 4,536,839 | 8/1985 | Shah et al. | 364/200 |
| 4,675,812 | 6/1987 | Capowski et al. | 364/200 |
| 4,730,268 | 3/1988 | Marin | 364/900 |
| 4,814,974 | 3/1989 | Narayanan et al. | 364/200 |

Primary Examiner—Eddie P. Chan
Assistant Examiner—Paul Kulik
Attorney, Agent, or Firm—Raymond J. Warren

[57] ABSTRACT

A bus arbiter for a multi-processor computer provides fair access by dynamically adjusting a base variable of a counter which is determined from a processor number of a previously access-requesting processor having the highest processor number. The counter then varies priority between a minimum processor number, such as zero, and the base variable of the counter. The priority signal from the counter and the current access-requesting processors are then provided to a memory device. The memory device is used to determine which current access-requesting processor is permitted to access the bus.

7 Claims, 3 Drawing Sheets

4,974,148

BUS ARBITER WITH EQUITABLE PRIORITY SCHEME

TECHNICAL FIELD

This invention relates generally to digital data processing, and, in particular, to a bus arbiter providing equitable access by each of a plurality of processors.

BACKGROUND OF THE INVENTION

Generally, a bus arbiter assigns control of a bus to a single processor when one or more of the processors in a system attempts to access the system bus. This arbitration function is often referred to as assigning priority to an individual processor in the system.

One problem with prior art bus arbiters is that they are not equitable (i.e., some processors receive highest priority more often than others) when less than the designated maximum number of processors are operating in the system. For example, in a full four-processor roundrobin scheme with only three processors, assigned to numbers 0, 1, and 2, processor 0 would receive highest priority twice during each cycle, while processors 1 and 2 would receive highest priority only once.

Other problems exist in prior art bus arbiters. For example, a flip-flop is required for each processor. Also, non-requesting, slow-requesting or improper functioning processors are included in the arbitration function which can delay the entire system. Additionally, jumper wires or switches, which easily can be improperly set, are required to select the number of processors in the system.

BRIEF SUMMARY OF THE INVENTION

The present invention pertains to a dynamic bus arbiter for a multi-processor computer system comprising a highest priority latch to determine the highest number of processors which have issued a bus request, and a variable modulo counter which counts from zero to the highest number of requesting processors. The variable modulo counter provides a signal which assigns bus priority to requesting processors in a fair manner.

It is thus an object of the present invention to provide a new and improved bus arbiter which is fair in systems which have fewer processors than the maximum number of the priority counter.

It is a further object of the present invention to provide a new and improved bus arbiter which requires only one flip-flop per bit in the binary representation of the highest number of processors.

Another object of the present invention is to provide a new and improved bus arbiter which does not include non-requesting or slow requesting processors in the arbitration function until they request the bus.

It is an additional object of the present invention to provide a new and improved bus arbiter which includes in the arbitration function only processors which successfully come out of reset.

Furthermore, it is an object of the present invention to provide a new and improved bus arbiter which does not require jumper wires or switches to select the number of processors in the system.

These and other objects of this invention will become apparent to those skilled in the art upon consideration of the accompanying specification, claims and drawings.

BRIEF DESCRIPTION OF THE DRAWINGS

Referring to the drawings.

DESCRIPTION OF THE PREFERRED EMBODIMENT

Figure 1:
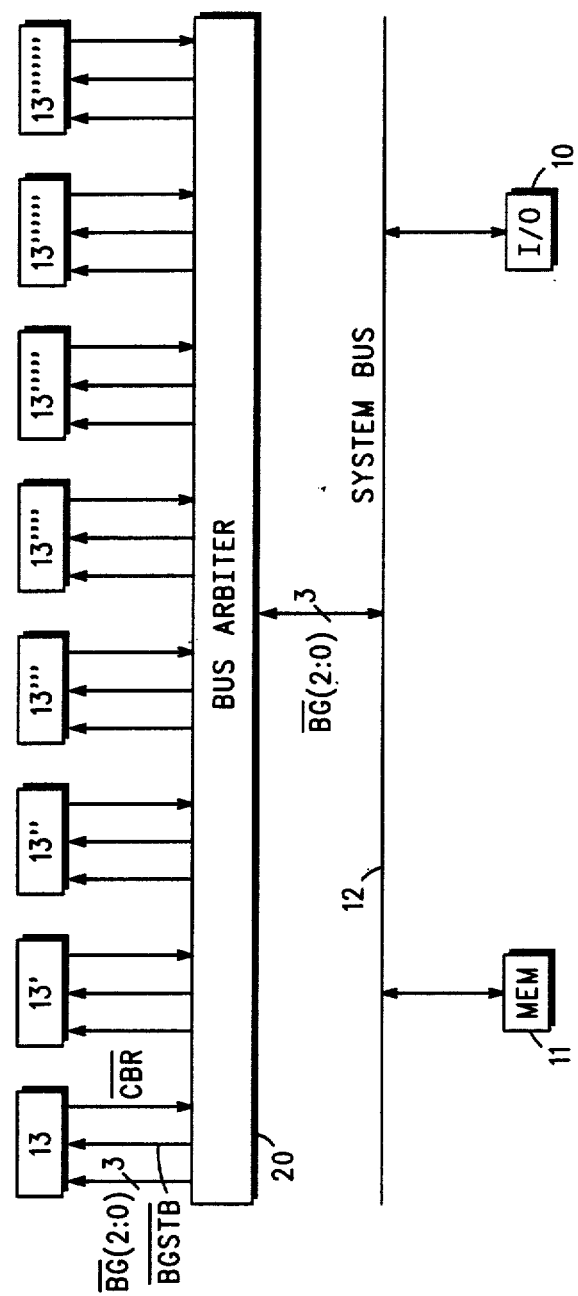
FIG. 1 is a block diagram of an eight processor system with a bus arbiter.

FIG. 1 illustrates a block diagram of an eight processor system 7 having an input/output device 10, a memory device 11, a system bus line 12, a bus arbiter 20, and a series of eight processors 13. The series of eight processors 13 are provided access to system bus line 12 by the functioning of bus arbiter 20. Each of processors 13 has a Bus Request line $\overline{CBR}$ (Current Bus Request) which supplies a signal to bus arbiter 20 and a $\overline{BGSTB}$ (Bus Grant Strobe) line to receive a signal from bus arbiter 20. Each of processors 13 also receives signals on three Bus Grant lines BG (2:0) from bus arbiter 20.

Figure 2:
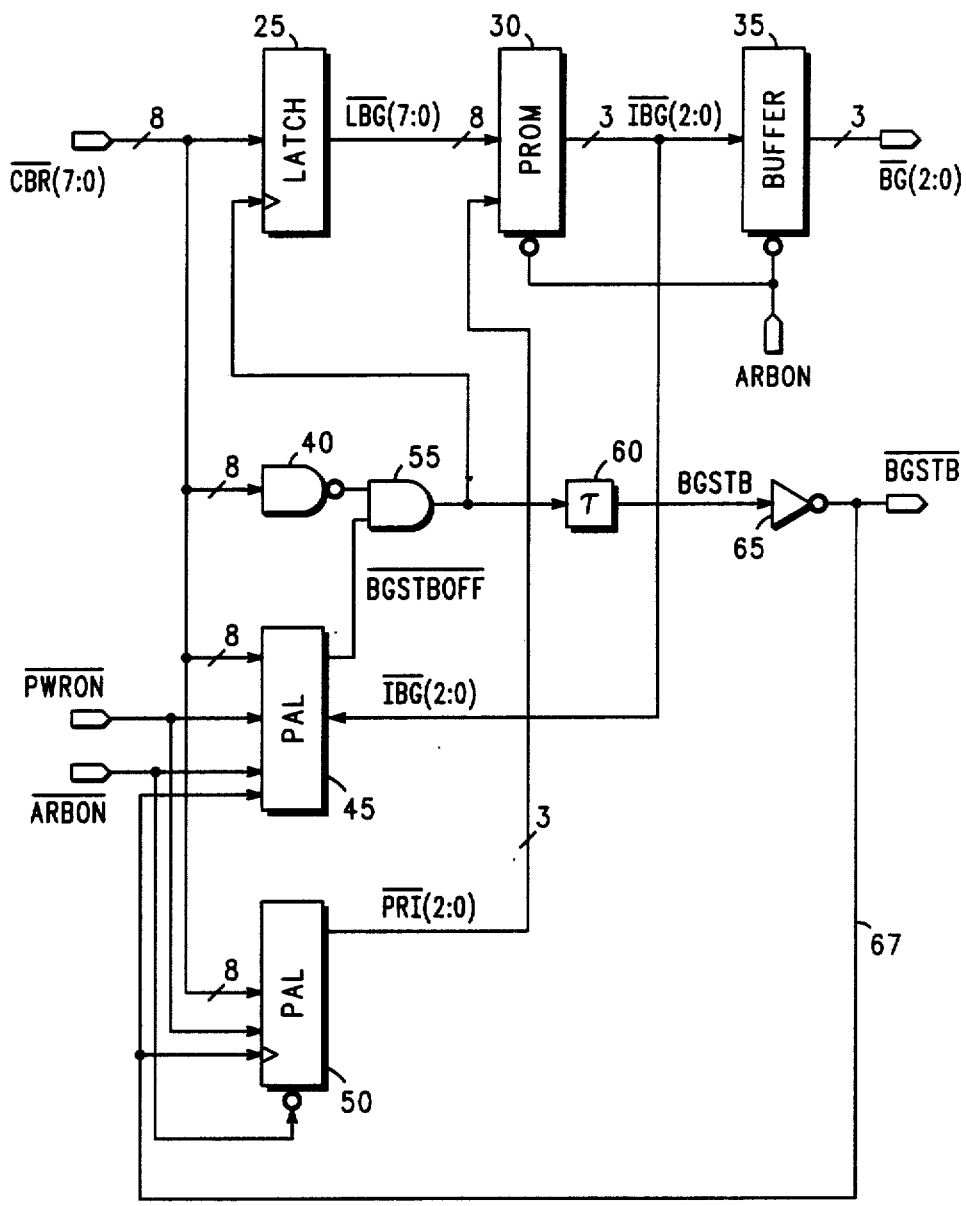
FIG. 2 is block diagram of a bus arbiter embodying the present invention.

Referring specifically to FIG. 2, bus arbiter 20 is shown for an eight processor computer system such as system 7 of FIG. 1. An octal latch 25 receives a series of eight Bus Request lines $\overline{CBR}$ (7:0) one each from processors 13. When any bus requests are present, the state of the $\overline{CBR}$ (7:0) signals will be latched into octal latch 25 in order to old the input lines stable. Latch 25 has eight Latched Bus Request output lines $\overline{LBR}$ (7:0) which are fed to address lines of programmable read only memory (PROM) 30.

PROM 30 has its final three address lines supplied by current priority lines $\overline{PRI}$ (2:0) which will be described in more detail later. PROM 30 generates three Internal Bus Grant lines $\overline{IBG}$ (2:0) which indicate which of the requesting processors should take control of a bus linking the system. It should be apparent to those skilled in the art that with proper programming, PROM 30 could be a 2K×4 PROM which would operate properly for a 3-bit, 8 processor computer system; however, a 2K×8 PROM was utilized in a preferred embodiment. The system is referred to as "3-bit" since it takes three bits to provide a count of eight which provides for each processor in the system. Internal Bus Grant lines $\overline{IBG}$ (2:0) from PROM 30 are buffered through buffer element 35 which generates an output over three Bus Grant lines $\overline{BG}$ (2:0). Bus Grant lines $\overline{BG}$ (2:0) are output onto the bus linking the system.

Bus Request lines $\overline{CBR}$ (7:0) are also fed into a NAND gate 40, a programmed array logic (PAL) device 45 and a PAL device 50. Additionally, PAL device 45 has a $\overline{PWRON}$ line to provide a signal that the system is operating and an $\overline{ARBON}$ (Arbiter ON) line to provide a signal that arbiter 20 is operating. PAL device 45 also receives Internal Bus Grant lines $\overline{IBG}$ (2:0). PAL device 45 has a Bus Grant Strobe Off output line $\overline{BGSTBOFF}$ which, along with the output line of NAND gate 40, form the inputs to AND gate 55. The output line of AND gate 55 is fed to the clock input of latch 25 and also to a delay element 60. Delay element 60 has a Bus Grant Strobe output line $\overline{BGSTB}$ which is fed into a NOT gate 65. NOT gate 65 has an output line 67 coupled to PAL devices 45 and 50 and to the processors in the system. The output of NOT gate 65 is the inverse of $\overline{\text{BGSTB}}$ and is used to indicate to the requesting processors that Bus Grant lines $\overline{\text{BG}}$ (2:0) are valid.

It should be apparent that delay element 60 should have a time delay equal to the amount of time it takes for a signal to pass through latch 25, PROM 30, and buffer element 35. When using PROM 30 (having a 35 ns delay), and latch 25 (having a 7.2 ns delay), a 40 ns. delay time in element 60 is sufficient, but adjustments may be required to have the signals on $\overline{\text{BGSTB}}$ and $\overline{\text{BG}}$ (2:0) coincide if components with different delay times are used.

The operation of bus arbiter 20 will now be described. When $\overline{\text{BGSTB}}$ is asserted, PAL device 45 compares the current Bus Request lines $\overline{\text{CRB}}$ (7:0) with the Internal Bus Grant lines $\overline{\text{IBS}}$ (2:0). When the requesting processor determines that it has received $\overline{\text{BG}}$ (2:0), it negates its Bus Request line until it determines $\overline{\text{BGSTB}}$ has been negated.

Once PAL device 45 determines, through $\overline{\text{CBR}}$, that the bus request that corresponds to the bus grant is no longer active, it asserts $\overline{\text{BGSTBOFF}}$. This causes the clock input on latch 25 to go low even if there are other bus requests pending. It also causes $\overline{\text{BGSTB}}$ to be deasserted after the delay time of delay element 60. When PAL device 45 determines that $\overline{\text{BGSTB}}$ has been deasserted, it deasserts $\overline{\text{BGSTBOFF}}$. This causes a rising edge on the clock input of latch 25 if there are requests pending; otherwise, the next request causes a rising edge on the clock input of latch 25. In either case, the cycle is then repeated.

PAL device 50 is utilized to determine the next priority level for the system. It performs this function by supplying current priority lines $\overline{\text{PRI}}$ (2:0) to PROM 30. In a conventional round robin arbiter, PAL device 50 would be a simple three-bit counter which would be incremented or decremented on each clock pulse to give the number of the highest priority processor. This, of course, results in a system which is not fair if there are less than eight processors in the system.

To overcome this problem, bus arbiter 20 of FIG. 2 has a highest priority latch and a variable modulo counter implemented in PAL device 50. These two new circuits are best understood by referring to the functional state diagrams in FIGS. 3 and 4.

Figure 3:
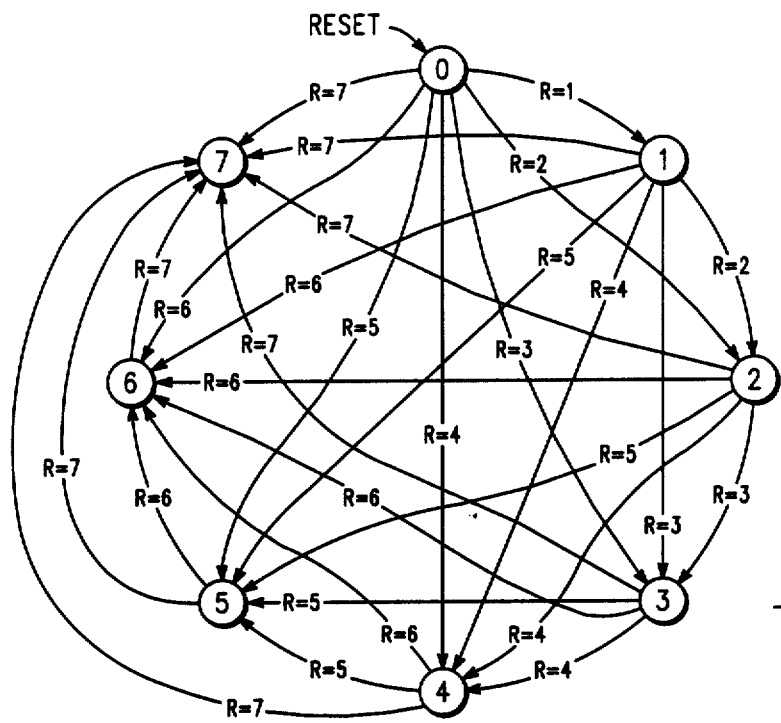
FIG. 3 is a functional state diagram of a highest priority latch utilized in the present invention.

Referring specifically to FIG. 3, the state diagram of the highest priority latch is shown. The purpose of this logic is to monitor the Bus Request lines $\overline{\text{CBR}}$ (7:0) and to determine the highest processor number which has issued a request. Numbers are assigned to processors coming out of reset starting with zero and continuing in order up to a maximum of seven. The highest requesting processor number is signified in FIG. 3 by the letter R.

At reset, the value of the highest priority latch, or base variable of the counter, is set to zero. At each clock received from the output of NOT gate 65 (see FIG. 2), the current value of the highest priority latch is compared with the highest requesting processor number R. If the highest requesting processor number R is higher than the current value of the highest priority latch, the highest priority latch is set to the value of the highest requesting processor number R.

The value that the highest priority latch is set to is then fed into the variable modulo counter to determine how high the variable modulo counter will count. For example, if the highest priority latch is set to five, the variable modulo counter is made a zero-to-five counter. However, if the highest priority latch is set to seven, the variable modulo counter is then made a zero-to-seven counter. Instability which would occur, if the value that the highest priority latch was set to was changed while the variable modulo counter was counting, is avoided, since the update of the highest priority latch utilizes the same clock as the update of the variable modulo counter.

Figure 4:
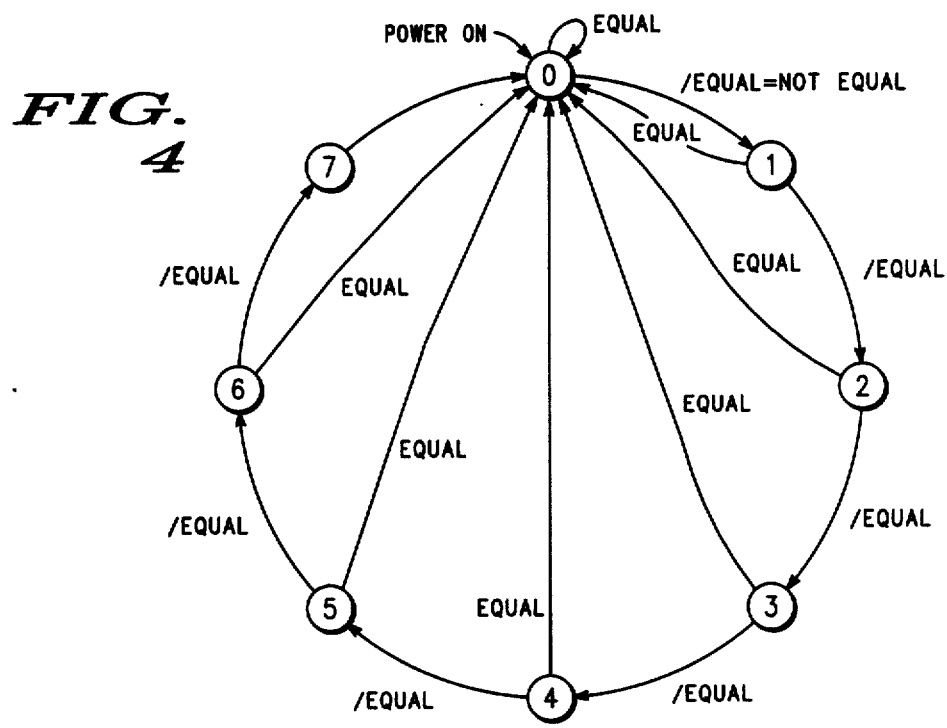
FIG. 4 is a functional state diagram of a variable modulo counter utilized in the present invention.

The state diagram for the variable modulo counter is illustrated in FIG. 4. At power-on the variable modulo counter is set to zero. At each clock after power-on, the current value of this counter is compared with the value of the highest priority latch. If the two values are equal, the counter is set to zero; if the two values are not equal, the counter is incremented by one. The output of the variable modulo counter is then sent over current priority lines $\overline{\text{PRI}}$ (2:0) to PROM 30 to assure fair bus access.

While a fair bus arbiter for a three-bit, 8 processor computer system has been shown and described, it should be apparent to those skilled in the art that modifications can be made to adapt the bus arbiter to systems having more or fewer processors.

Thus, while I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

I claim:

1. A bus arbiter for a computer system comprising a plurality of processors coupled to a bus to which at least one of said processors requests access by generating a bus request signal, each of said plurality of processors having associated therewith a processor number, said bus arbiter comprising:
   clock means for generating a clock signal, said clock means comprising;
   a first gate responsive to said bus request signal and generating a first output signal;
   first logic means responsive to said bus request signal, to a delayed clock signal, and to a bus grant signal for generating a second output signal;
   a second gate responsive to said first and second output signals and generating said clock signal;
   signal delay means responsive to said clock signal for generating said delayed clock signal;
   second logic means for generating a count signal representing a number of a processor being given priority;
   latch means responsive to said bus request signal and to said clock signal for generating a latched bus request signal; and
   bus grant means responsive to said latched bus request signal and to said count signal for generating said bus grant signal, permitting one of said access-requesting processors to access said bus.

2. The bus arbiter recited in claim 1, wherein said bus grant means comprises:
   a memory receiving said latched bus request signal and said count signal and providing said bus grant signal; and
   buffer means coupled to said memory for driving said bus grant signal.

3. The bus arbiter recited in claim 2 wherein said signal delay means delays said clock signal by a time greater than a time delay of a signal transmitted through said latch means, said memory, and said buffer means.

4. The bus arbiter recited in claim 1 wherein said first gate comprises a logical NAND gate.

5. The bus arbiter recited in claim 1 wherein said first and second logic means comprise programmable array logic devices.

6. The bus arbiter recited in claim 1 wherein said second gate comprises a logical AND gate.

7. The bus arbiter of claim 1 wherein said number of said processor being given priority is a highest processor number of a previously requesting processor.

* * * * *